Dec. 26, 1939.  V. W. SMITH ET AL  2,184,626
FIREBOX SUPERHEATER
Filed Feb. 10, 1938  4 Sheets-Sheet 2
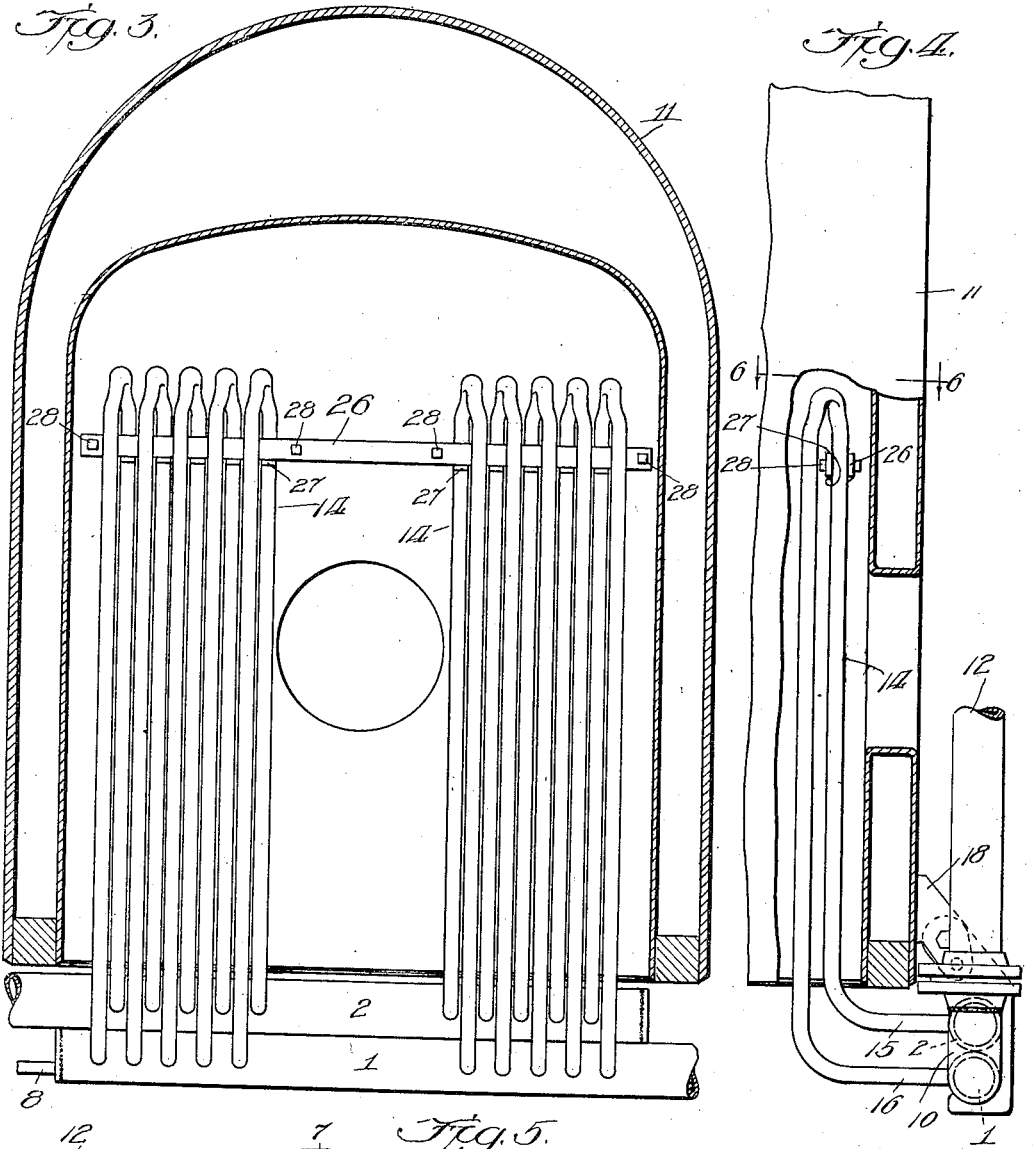
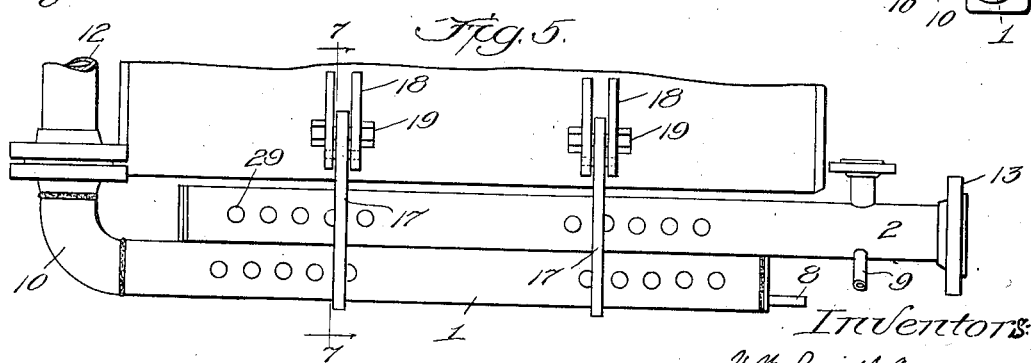

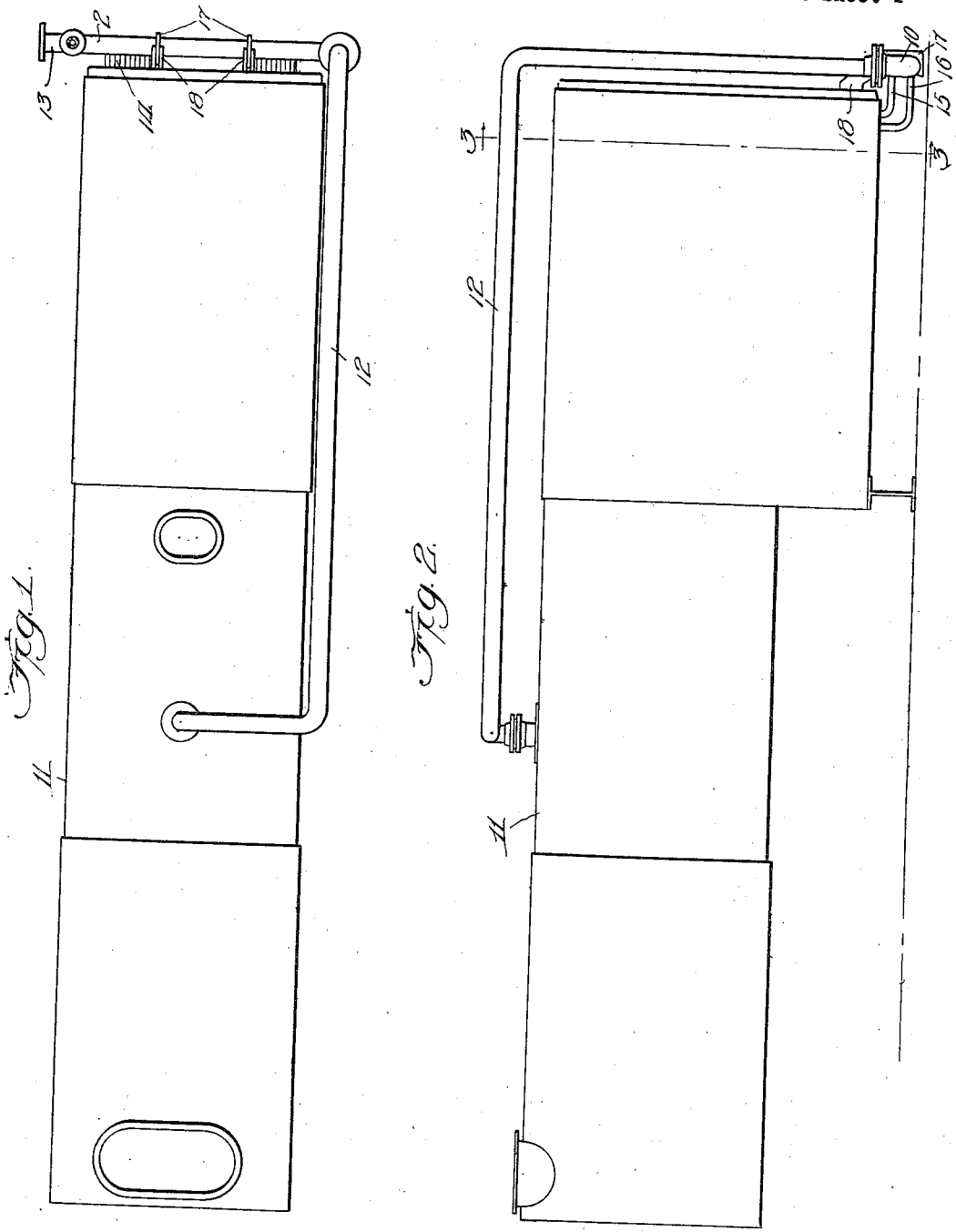
Dec. 26, 1939. V. W. SMITH ET AL 2,184,626
FIREBOX SUPERHEATER
Filed Feb. 10, 1938 4 Sheets-Sheet 1

Dec. 26, 1939.  V. W. SMITH ET AL  2,184,626
FIREBOX SUPERHEATER
Filed Feb. 10, 1938  4 Sheets-Sheet 3
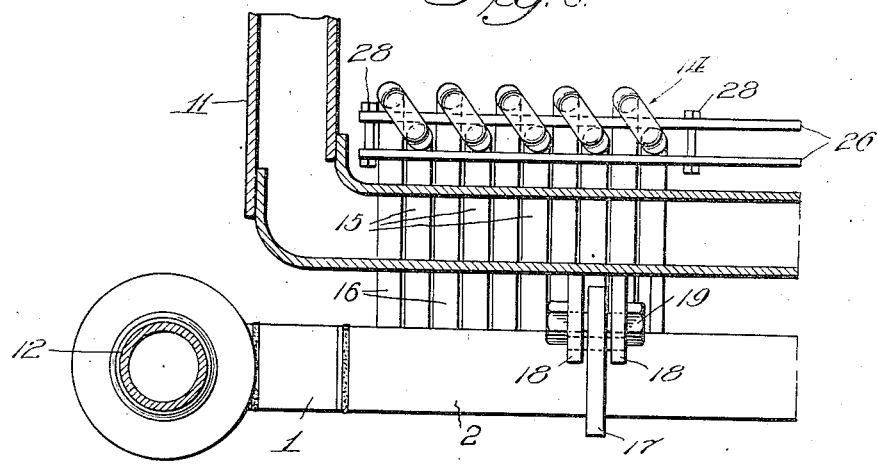
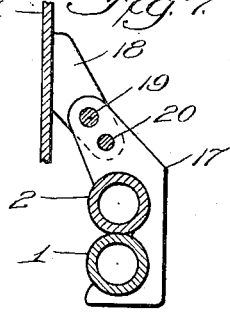
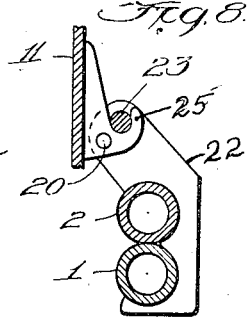
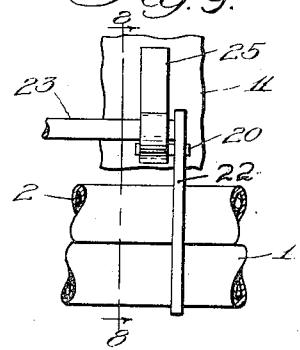
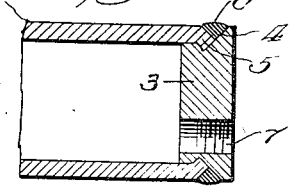
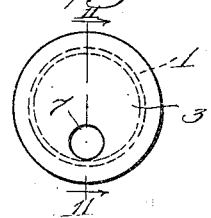
Inventors
V. W. Smith &
H. M. Wolf,
by Wm. F. Freudenreich
Atty.

Dec. 26, 1939.  V. W. SMITH ET AL  2,184,626
FIREBOX SUPERHEATER
Filed Feb. 10, 1938     4 Sheets-Sheet 4
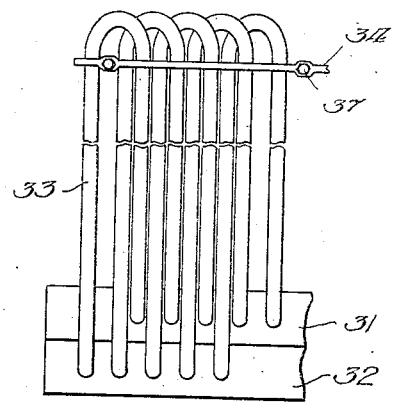
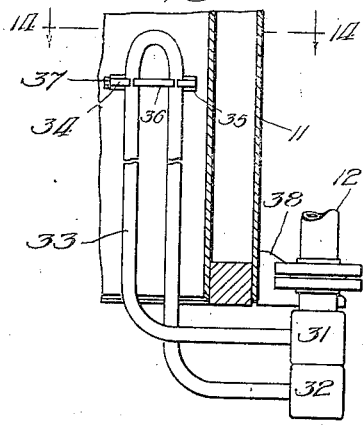
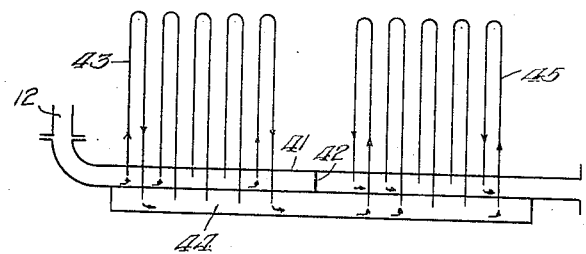
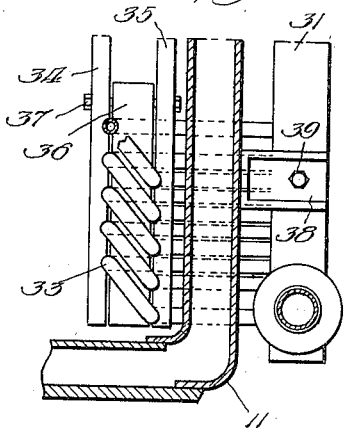
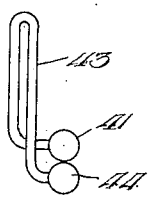
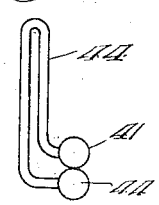
Inventors:
V. W. Smith,
H. M. Wolf,
by Wm. F. Freudenreich, Atty.

Patented Dec. 26, 1939

2,184,626

UNITED STATES PATENT OFFICE 2,184,626

FIREBOX SUPERHEATER

Vincent W. Smith and Howard M. Wolf, Muncie, Ind., assignors to The Broderick Company, a corporation of Indiana Application February 10, 1938, Serial No. 189,818

3 Claims. (Cl. 122—481)

The present invention relates to the art of superheating steam generated in boilers by passing the steam through superheater coils arranged within the fireboxes or furnace chambers with which the boilers are associated, and has for its object to produce a simple, novel and efficient apparatus of this type.

The invention has for a further object to produce a superheater that can readily be applied to any locomotive type boiler without making any changes in the latter; a subsidiary object being, therefore, that no special tubes are required in the boiler.

A further object of the invention is to produce a superheater that can readily be removed and replaced so as not only to be easily installed but be adapted to be taken out for repairs or when the boiler is to be moved, as well as being adapted to be applied to boilers already in service.

A further object of the present invention is to produce a simple and novel superheater which may be installed adjacent to the less effective heating surfaces of the firebox, so as not materially to reduce the steam generating capacity, although it may be located beside any wall or beside more than one wall.

A further object of the present invention is to produce a superheater whose capacity may be varied by simply changing the number or length of tube units, without requiring any change in the remainder of the superheater or in the boiler itself.

A further object of the present invention is to provide a superheater that is drainable in the operating position.

The various features of novelty whereby our invention is characterized will hereinafter be pointed out with particularity in the claims; but, for a full understanding of our invention and of its objects and advantages, reference may be had to the following detailed description taken in connection with the accompanying drawings, wherein:

Figure 1 is a top plan view of a locomotive type boiler having one of our superheaters applied thereto; Fig. 2 is a side elevation of the boiler; Fig. 3 is a section, on a larger scale, on line 3—3 of Fig. 2; Fig. 4 is a side elevation of a fragment of a boiler, on the same scale as Fig. 3, the walls being partly broken away to expose the tube units; Fig. 5 is a front view of the boiler, showing only the extreme lower portion thereof and the superheater headers; Fig. 6 is a section on line 6—6 of Fig. 4, on a still larger scale; Fig. 7 is a section on line 7—7 of Fig. 5; Fig. 8 is a view similar to Fig. 7, showing a modification, the same being a section on line 8—8 of Fig. 9; Fig. 9 is a front view of fragments of the front wall of the boiler and of the headers, illustrating the hanger of Fig. 8; Fig. 10 is an end view of one of the headers; Fig. 11 is a section on line 11—11 of Fig. 10; Fig. 12 is a front elevation of a modified form of apparatus, only a fragment being shown; Fig. 13 is a vertical section through the front end of a firebox showing the superheater of Fig. 12 installed therein; Fig. 14 is a section on line 14—14 of Fig. 13; Fig. 15 is a diagrammatic view illustrating a further modification of the superheater; Fig. 16 is an end view, showing the two headers and one of the tubular units such as employed in the lefthand half of Fig. 15; and Fig. 17 is a view similar to Fig. 16, showing the condition in the righthand half of the apparatus appearing in Fig. 15.

Referring to Figs. 1 to 11, inclusive, 1 and 2 represent headers of any desired length which may be of any desired cross sectional shapes and may be formed integral with each other or as separate members. In the arrangement shown, the headers are sections of thick-walled pipes each having one end closed and its other end fitted with means to connect it to a steam conduit. For example, as illustrated in Figs. 10 and 11, one end of each pipe may be closed by a plug 3 having a reduced portion fitting into the pipe and an external annular groove 4 into which the extreme end portion of the pipe may be flanged, as indicated at 5, the plug and the flange being welded together as indicated at 6. Each plug may contain a hole 7 extending through the same close to the inner surface of the header, for the purpose of receiving a drain pipe, such as shown at 8 in Figs. 3 and 5. If desired, the drains may extend radially from the headers proper, as indicated at 9 in Fig. 5. The open end of the header 1 has an elbow 10 fixed thereto; this elbow being adapted to be connected to the steam space in a boiler 11 by a conduit 12. The open end of the header 2 is provided with one member 13 of any suitable coupling adapted to connect this header to a steam delivery conduit.

The headers are placed in communication with each other through superheater elements in the form of tubes 14 bent into inverted U's and having their free ends bent laterally, as indicated at 15 and 16, and fixed to the headers. The ends 15 are all fastened to the header 2 and the ends 16 to the header 1. It is desired that each U-shaped tube lie in a plane making an acute angle with the adjacent wall of the furnace or firebox; thereby arranging the legs of U's in two rows one in front of the other, with those in one row positioned in staggered relation to those in the other row.

It will thus be seen that if the superheater tubes of a device are placed upright within a firebox or furnace chamber, beside a wall of the latter, some of the radiant heat from the fire is absorbed by the tubes in the front row; some passes through the gaps between the tubes of the front row and impinges on the tubes in the rear row; and some passes through the gaps between the tubes of the rear row and is absorbed by the furnace or firebox wall. However, the front row of tubes serves as a protective screen which shields the tubes in the rear row, so that the latter do not become as hot as those in the front row. The result is that while the tubes in the front row may be highly heated by radiant heat, heat will be radiated to the tubes in the rear row thereby tending to equalize the tube temperature of the two rows. The temperatures of the tubes in both rows can be further equalized by causing the steam which is to be superheated to flow first through the tubes in the front row and then through those in the back row. The tubes in the front row therefore contain the cooler steam which helps reduce their temperature, whereas the tubes in the rear row carry the hot steam which serves to raise the temperature thereof. Thus, there is attained a sufficient balance in the heating of the tubular structure to avoid objectionable warping or other serious consequences that would arise from too uneven heating.

In the drawings there is illustrated a superheater apparatus adapted to be placed in the firebox door end of a firebox of a locomotive type boiler; there being two sets or batteries of superheater tubes adapted to be located on opposite sides of the furnace door. The apparatus is installed by laying the superheater tubes flat on the ground or floor and shifting the apparatus bodily so as to carry the tubes underneath the firebox. The tubes may then be swung up into the firebox and the entire apparatus shifted until the upright tubes lie a short distance away from the outer end wall of the firebox. The bent ends 15 and 16 of the tubes now extend outwardly underneath the said wall of the firebox and the headers lie just outwardly from that wall.

The apparatus may be secured in its operative position in any suitable manner. Thus, the headers may be held in hangers 17, 17 in the form of plates each of which extends upwardly between the ears of a bracket 18 fixed to the outside wall of the firebox. The hangers may be fastened to the brackets by means of bolts 19, and may be held against angular movements about the bolts by means of pins 20 which also pass through the hangers and the brackets, as shown in Fig. 7.

The hangers may, on the other hand, take a form such as shown at Figs. 8 and 9, two or more plates 22 being distributed along and fixed at their upper ends to a long cross bar 23. This cross bar is adapted to be engaged with hooks 24 on brackets 25 mounted on the front wall of the boiler. These hangers may also be secured against swinging movements by pins 20 as in the case of the other type of hanger.

When it is desired to remove the superheater apparatus, all that need be done is to withdraw the pins 20, swing the apparatus in the direction to carry the superheater tubes down through the bottom of the firebox, detach the hangers from their supporting brackets, and then withdraw the apparatus as a whole.

The lower ends of the U-shaped tubes are sufficiently anchored through their connections with the headers, but the upper, looped ends might possibly become displaced relatively to each other in handling or during service, unless restrained from doing so. Therefore, to prevent such displacement, we tie the upper ends of the looped tubes together. This may conveniently be accomplished by extending heat resisting bars 26 across the corresponding legs of the tubes near the loops in the latter. The tubes may be provided with lugs 27 that engage these bars and, when the bars are secured together, by bolts 28, for example, prevent the bars from being displaced lengthwise of the tubes. Each tube is thus left free to expand and contract independently of the other tubes. Where there are two groups of tubes, as shown, these bars may and preferably do extend continuously across both groups.

The superheater tubes may be joined to the headers in any suitable way by any standard joint, rolled in, welded, or the metal to metal type. When rolled in joints are used, there should be hand holes in the walls of the headers, as indicated at 29 in Fig. 5.

In Figs. 12 to 14 there is illustrated a somewhat different arrangement in which the headers are square, as indicated at 31 and 32; the steam to be superheated being admitted to the upper header 31 through the conduit 12 and passing to the U-shaped tubes 33 whose legs cross each other below the firebox. Therefore, although the steam enters the upper header, it rises through the forward legs of the U-shaped tubes and descends through the legs that form the back row. The upper ends of the header tubes are shown as being clamped together by means of bars 34 and 35 extending across the front and rear, respectively; there being spacers 36 extending transversely of the tubes between the legs of the U's. Bolts 37 extending through the clamping elements secure them together and hold the upper ends of the tubes firmly against relative displacement and, if desired, fasten them to the firebox wall. The upper of the two headers is shown as fastened to overlying brackets 38 welded or otherwise secured to the front wall of the boiler, by means of bolts 39.

In Fig. 15 there is illustrated diagrammatically an arrangement in which the steam is heated twice. The upper header 41 has between the ends a partition 42 which interrupts communication between the two halves of the header. Steam from the conduit 12 enters the upper header and flows through the tubes 43 on the lefthand side of the partition 42, and down through the lefthand end of the header 44. From the lower header the steam passes through a second group of superheating tubes 45 and from there into the upper header on the righthand side of the partition 42; and from there to the point of use.

Thus, the lefthand half of the header 41 corresponds to the inlet header of the other two forms and the righthand half to the outlet header, while the header 44 may be regarded as an intermediate header to carry the partially superheated steam from the first group or battery of tubes to the second.

From an examination of Figs. 16 and 17, it will be seen that it is always the cooler steam which is flowing through the tubes nearest the fire; the arrangement of the tubes 43 being the same as that of the tubes 33 in the second form; whereas the legs of the tubes 44 do not cross each other for, although the steam to be further heated enters these tubes from the lower end, it rises in what we have termed the forward row of tubes which is closest to the fire and descends through the rearmost tubes that are closest to the furnace wall.

It will be seen that each of the few forms illustrated as examples of preferred embodiments of our invention constitutes a simple, rugged, self-contained superheater unit which requires no change in a boiler or its tubing; which can readily be installed and removed; whose capacity may be varied by simply multiplying units or by adding or subtracting superheater tubes or by changing the length of the units without changing the headers; which can be installed in fireboxes or furnaces already in use; which, because of the manner in which some of the superheating tubes screen the remainder and because of the course of flow of the steam, insures a sufficiently even distribution of heat in the superheater tubes to permit the use of thin walled tubes; in which, because of the large variations in the length and number of tubes that may be used a high steam velocity can be maintained; which, because of the arrangement of the tubes and the headers, makes it easy to drain the apparatus; and which may be kept from overheating, in firing up, by opening the drain on the outlet header of the superheater.

While we have illustrated and described with particularity only a single preferred form of our invention, with a few modifications, we do not desire to be limited to the exact structural details thus illustrated and described; but intend to cover all forms and arrangements which come within the definitions of our invention constituting the appended claims.

We claim:

1. The combination with a firebox open at the bottom, of upright superheater tubes arranged in two rows one behind the other, near and parallel to the inner side of a wall of said firebox, the upper ends of the tubes in one row being connected to the upper ends of the corresponding tubes in the other row, a header device on the outer side of the firebox, means extending under said wall and connecting the lower ends of the tubes to the header device, and means securing said header device to said wall for bodily rotation of the header device and the tubes about a horizontal axis so located that the tubes may be swung into an approximately horizontal position below the firebox.

2. The combination with a firebox open at the bottom, of upright superheater tubes arranged in two rows one behind the other, near and parallel to the inner side of a wall of said firebox, the upper ends of the tubes in one row being connected to the upper ends of the corresponding tubes in the other row, a header device on the outer side of the firebox, means extending under said wall and connecting the lower ends of the tubes to the header device, stationary brackets on the outer side of the wall and having open bearing seats, hangers so supporting the header device and so engaged with said bearing seats as to be capable of swinging movements about a horizontal axis above and parallel to the header device, and releasable means to hold said hangers against swinging movements.

3. In combination with a firebox open at the bottom, of a superheater unit comprising a header device lying below the level of the bottom of the firebox and superheater tubes connected to said device and extending laterally therefrom, the parts being so proportioned that when the said unit is placed underneath the firebox it may be shifted angularly to bring the superheater tubes into upright positions within the firebox while the header device occupies its normal working position, and means on the exterior of the furnace for detachably supporting the header device to maintain said superheater tubes in such upright positions.

VINCENT W. SMITH.
HOWARD M. WOLF.